United States Patent
Sitaram et al.

(10) Patent No.: US 9,769,794 B1
(45) Date of Patent: Sep. 19, 2017

(54) METHOD AND SYSTEM FOR ADDRESSING A THRESHOLD EXTENT OF FAILURE OF PAGING IN A NETWORK

(71) Applicant: Sprint Spectrum L.P., Overland Park, KS (US)

(72) Inventors: Krishna Sitaram, Chantilly, VA (US); Chunmei Liu, Great Falls, VA (US); Hemanth B. Pawar, Brambleton, VA (US); Shilpa Kowdley Srinivas, Brambleton, VA (US)

(73) Assignee: Sprint Spectrum L.P., Overland Park, KS (US)

( * ) Notice: Subject to any disclaimer, the term of this patent is extended or adjusted under 35 U.S.C. 154(b) by 0 days.

(21) Appl. No.: 15/200,386

(22) Filed: Jul. 1, 2016

(51) Int. Cl.
*H04W 68/00* (2009.01)
*H04W 68/02* (2009.01)
*H04W 76/04* (2009.01)
*H04W 72/00* (2009.01)
*H04W 88/06* (2009.01)
*H04W 92/10* (2009.01)

(52) U.S. Cl.
CPC ......... *H04W 68/02* (2013.01); *H04W 72/005* (2013.01); *H04W 76/046* (2013.01); *H04W 88/06* (2013.01); *H04W 92/10* (2013.01)

(58) Field of Classification Search
CPC ....... H04W 8/00; H04W 36/00; H04W 68/02; H04W 72/005; H04W 88/06; H04W 76/023; H04W 76/025; H04W 76/046; H04W 92/02; H04W 92/10
USPC ............ 455/450, 458, 434, 552.1, 445, 436; 370/328, 331, 338, 401
See application file for complete search history.

(56) References Cited

U.S. PATENT DOCUMENTS

2016/0044545 A1* 2/2016 Yang ................. H04W 36/0022
370/331
2016/0323813 A1* 11/2016 Chen ................. H04W 36/0022

* cited by examiner

*Primary Examiner* — Wayne Cai

(57) ABSTRACT

In accordance with the disclosed methods and systems, while providing a service that enables user equipment devices (UEs) being served by a first network to engage in signaling with a second network via the first network, a controller or other network entity may detect a failure of paging in the first network. In response to detecting the failure of paging, the first network may then cause one or more UEs being served by the first network to transition from operating in a first mode that uses the given service to operating in a second mode that does not use the given service.

20 Claims, 4 Drawing Sheets

METHOD AND SYSTEM FOR ADDRESSING A THRESHOLD EXTENT OF FAILURE OF PAGING IN A NETWORK

BACKGROUND

A typical cellular wireless network includes a number of base stations that radiate to define wireless coverage areas, such as cells and cell sectors, in which wireless communication devices (UEs), such as cell phones, tablet computers, tracking devices, embedded wireless modules, and other wirelessly equipped communication devices, can operate. In turn, each base station may be coupled with network infrastructure that provides connectivity with one or more transport networks, such as the public switched telephone network (PSTN) and/or the Internet for instance. With this arrangement, a UE within coverage of the network may engage in air interface communication with a base station and may thereby communicate via the base station with various remote network entities or with other UEs served by the base station.

In general, a cellular wireless network may operate in accordance with a particular air interface protocol or "radio access technology," with communications from the base stations to UEs defining a downlink or forward link and communications from the UEs to the base stations defining an uplink or reverse link. Examples of existing air interface protocols include, without limitation, Orthogonal Frequency Division Multiple Access (OFDMA (e.g., Long Term Evolution (LTE) or Wireless Interoperability for Microwave Access (WiMAX)), Code Division Multiple Access (CDMA) (e.g., 1xRTT and 1xEV-DO), and Global System for Mobile Communications (GSM), among others. Each protocol may define its own procedures for registration of UEs, initiation of communications, handoff between coverage areas, and functions related to air interface communication.

In accordance with the air interface protocol, each coverage area may operate on one or more carrier frequencies or "carriers." More particularly, the base station that radiates to define a given coverage area may support one or more frequency bands, such as the 800 MHz band (one or more frequency ranges around 800 MHz), the 1.9 GHz band (one or more frequency ranges around 1.9 GHz), and the 2.5 GHz band (one or more frequency ranges around 2.5 GHz), and may provide service on one or more carrier frequencies within each supported band. In a frequency division duplex (FDD) arrangement, different frequencies are used for the downlink than the uplink. Whereas, in a time division duplex (TDD) arrangement, the same frequency is used for the downlink and uplink and is allocated over time among downlink and uplink communications.

On each carrier frequency in a coverage area, the coverage area may also define a number of air interface channels for carrying information between the base station and the UEs. These channels may be defined in various ways, such as through frequency division multiplexing, time division multiplexing, and/or code-division multiplexing, for instance. By way of example, each coverage area may define a pilot channel, reference channel or other resource on which the base station may broadcast a pilot signal, reference signal, or the like that UEs may detect as an indication of coverage and may measure to evaluate coverage strength. As another example, each coverage area may define an uplink control channel or other resource on which UEs may transmit control messages such as registration requests and access requests to the base station. And each coverage area may define a downlink control channel or other resource on which the base station may transmit control messages such as system information messages and page messages to UEs. Each coverage area may then define one or more traffic channels or other resources for carrying communication traffic such as voice data and other data between the base station and UEs.

When a UE first powers on or enters into coverage of the network, the UE may scan for and identify a strongest pilot or reference signal and may register with the network by transmitting a registration request or attach request to a base station providing that signal. This registration process may serve to notify the network of the UE's presence in a particular coverage area and to facilitate network authentication of the UE. Once registered, the UE may then operate in an idle mode or connected or active mode. In the idle mode, the UE monitors a downlink control channel to receive overhead information and to check for any page messages, and the UE may have no assigned traffic channel resources on which to engage in bearer communication. In the connected or active mode, on the other hand, the UE may have assigned traffic channel resources on which to engage in beacon communications.

As explained above, when the network has a communication (such as a voice call or other traffic) to provide to a UE that is registered with the network but is operating in the idle mode, the network may page the UE in an effort to then facilitate assigning traffic channel resources to the UE. In particular, the network may transmit on the downlink a page message addressed to the UE. Assuming the UE receives this page message, the UE may then transmit to the network a page response message on the uplink. And upon receipt of the page response message, the network may then assign traffic channel resources to the UE, for use to carry the communication, thus transitioning the UE to the connected or active mode in which the UE can engage in the communication.

Likewise, when an idle UE seeks to initiate a communication (such as to place a voice call or engage in other bearer communication), the UE may transmit on the uplink to the base station an access, origination, or connection request, and the network may then assign traffic channel resources to the UE for use to carry the communication, similarly transitioning the UE to a connected or active mode in which the UE can engage in the communication.

OVERVIEW

In systems that provide service under more than one air interface protocol, service providers may implement functionality that allows UEs to operate by default on one air interface protocol and to dynamically switch over to operate on another air interface protocol when necessary to engage in certain communications. By way of example, in a system that includes a first radio access network (RAN) (e.g., an LTE RAN) that provides high speed data communications on a first air interface protocol and a second RAN (e.g., a CDMA RAN) that provides traditional telephony service on a second air interface protocol different from the first air interface protocol, service providers may implement an inter-RAN fallback service that allows UEs to operate by default in the first RAN and to "fall back" to operate in the second RAN to engage in voice calls. In the context of a hybrid LTE/CDMA system and other systems, the service is called "circuit switched fallback" (CSFB) service.

Within such a system, a UE may have two mutually exclusive modes of operation. In the first of these two modes, the UE may use the inter-RAN fallback service that allows UEs to operate by default in the first RAN and to fall back to operate in the second RAN to engage in voice calls. In the second of these two modes, on the other hand, the UE may not use the inter-RAN fallback service.

To facilitate operation in the first mode, after a UE registers with the first RAN, the UE may engage in pre-registration signaling with the second RAN via the first RAN in order to register for service of the second RAN and to notify the second RAN that the UE is accessible via the first RAN. Thereafter, the UE may then engage in call setup signaling with the second RAN, via the first RAN, to facilitate transition to the second RAN to engage in a voice call. In the context of a hybrid LTE/CDMA system, the first mode is called CSFB mode.

While in the first mode, when the UE seeks to place a voice call, the UE transmits a call-origination message to the first RAN, and the first RAN passes that call-origination message to the second RAN. Through possibly additional call setup signaling between the second RAN and the UE via the first RAN, the second RAN may then set up the voice call and, when appropriate, signal to the UE via the first RAN to cause the UE to transition from being served by the first RAN to instead being served by the second RAN, and the UE may then engage in the call served by the second RAN via the second air interface protocol.

Similarly while the UE is operating in the first mode, when the second RAN has a call to connect to the UE, the second RAN may transmit to the first RAN a page message or a paging trigger to cause the first RAN to page the UE, and the first RAN may then page the UE. Once that paging occurs, the UE may engage in possibly additional call setup signaling with the second RAN via the first RAN to facilitate transition of the UE to be served by the second RAN so as to receive the call served by the second RAN via the second air interface protocol or the UE may respond to the paging by then transitioning to the second RAN to receive the call.

To facilitate operation in the second mode, on the other hand, the UE may register with the second RAN directly via the second RAN rather than via the first RAN, and may be set to engage in call setup signaling with the second RAN directly via the second RAN rather than via the first RAN. Thereafter, while being served by the first RAN while operating in the second mode, the UE may communicate with the first RAN over the first air interface protocol (e.g., engaging in control and bearer data communication served by the first RAN), but may (i) periodically tune away from the first RAN (first air interface) to the second RAN (second air interface) in order to search for any page messages from the second RAN (i.e., for a UE-terminated call), or (ii) move over to the second RAN to originate a voice call. In the context of a hybrid LTE/CDMA system, the second mode is called "single-radio-LTE" (SRLTE) mode (i.e., non-CSFB mode).

Thus, while in the second mode, when the UE seeks to place a voice call, the UE tunes away from the first RAN to the second RAN and transmits directly via the second air interface protocol to the second RAN a call origination message, and the second RAN may then set up and serve the UE with the call via the second air interface protocol. And likewise, when the second RAN has an incoming call to connect to the UE, the second RAN transmits a page message to the UE directly via the second air interface protocol, which the UE detects and responds to when the UE is tuned away from the first RAN to the second RAN, and the second RAN may then likewise set up and serve the UE with the call via the second air interface protocol.

In some cases, a UE that is served by the first RAN may be configured to operate in either of these modes so as to facilitate engaging in voice calls or other types of communication. Typically, when a UE is served by the first RAN, the UE may be arranged to operate by default in the first mode.

As explained above, when a RAN (e.g., LTE RAN) has a communication (such as a voice call or other traffic) to provide to a UE that is registered with the RAN, the RAN may page the UE in an effort to facilitate assigning traffic channel resources to the UE. However, under certain circumstances, the RAN may encounter issues with paging that may result in a failure of the paging. The failure of the paging may affect the operation of the services that are provided by the RAN, and may result in delays and possibly even failures of the RAN establishing connections with UEs. For instance, a failure of paging in an LTE network may affect CSFB service that is provided by the LTE network, as the LTE network may not successfully page a UE operating in CSFB mode when a CDMA network has a call to provide to the UE.

Disclosed herein are methods and systems to help address paging failures in hybrid wireless communication systems. In accordance with the disclosure, a hybrid wireless communication system, which includes multiple separate but interconnected RANs, such as a first RAN (e.g., an LTE RAN) that provides high speed data communications and a second RAN (e.g., a CDMA RAN) that provides traditional telephony service, may be configured to take remedial measures in response to detecting a threshold extent of failure of paging in the first RAN. For instance, in response to detecting a threshold extent of failure in the first RAN, the system may select a hybrid UE operating in the first mode in the first RAN, and cause the selected hybrid UE to transition from operating in the first mode to operating in the second mode.

Accordingly, in one respect, disclosed is a method that takes place in a communication system including a first RAN configured to serve UEs over a first air interface, where the first RAN is interconnected with a second RAN configured to serve the UEs over a second air interface. Further, each UE served by the first RAN has a first mode of operation and a second mode of operation, and each UE operates by default in the first mode. The method involves (a) the first RAN paging one or more UEs and (b) the first RAN detecting a threshold extent of failure of the paging. Further, the method involves (c) responsive to at least the first RAN detecting the threshold extent of failure of the paging, the first RAN (i) selecting a UE from the one or more UEs and (ii) causing the selected UE to transition from operating in the first mode to operating in the second mode. In the first mode, while the selected UE is served by the first RAN via the first interface, the selected UE is registered with the second RAN via the first RAN and is configured to engage in call setup signaling with the second RAN via the first air interface. And in the second mode, while the selected UE is served by the first RAN via the first interface, the selected UE is registered directly with the second RAN and is configured to engage in call setup signaling with the second RAN via the second air interface.

In another respect, disclosed is another method that takes place in a communication system including a first RAN configured to serve UEs over a first air interface, where the first RAN is interconnected with a second RAN configured to serve the UEs over a second air interface. Each UE served by the first RAN supports CSFB mode and non-CSFB mode, and each UE operates by default in CSFB mode. The method involves (a) the first RAN paging one or more UEs and (b) the first RAN detecting a failure of the paging. Further, the method involves (c) responsive to at least the first RAN detecting the failure of the paging, the first RAN causing at least one UE of the one or more UEs to transition from operating in CSFB mode to operating in non-CSFB mode. In CSFB mode, while the at least one UE is served by the first RAN via the first interface, the at least one UE is registered with the second RAN via the first RAN and is configured to engage in call setup signaling with the second RAN via the first air interface. And in non-CSFB mode, while at least one UE is served by the first RAN via the first interface, the at least one UE is registered directly with the second RAN and is configured to engage in call setup signaling with the second RAN via the second air interface.

Still further, disclosed is a wireless communications system including one or more base stations of a first RAN serving UEs over a first air interface. The system also includes an interconnection between the first RAN and a fallback RAN that serves the UEs over a second air interface different from the first air interface. The first RAN is configured to provide an inter-RAN fallback service to the UEs in which, while the UEs are served by the first RAN, the first RAN passes pre-registration signaling and call-setup signaling between the fallback RAN and the UEs to facilitate transition of the UEs from being served over the first air interface by the first RAN to being served with calls over the second air interface by the fallback RAN. The system also includes a controller configured to cause the one or more base stations to carry out various wireless communication system functions described herein. In particular, the controller is configured to page one or more UEs served by a first base station of the one or more base stations, detect a threshold extent of failure of the paging, and responsive to at least detecting the threshold extent of failure of the paging, broadcast, via the first base station, a signal that indicates that the first base station does not support the inter-RAN fallback service.

Also disclosed herein are various network entities configured to facilitate implementation of the disclosed methods. One embodiment of these network entities includes (a) a network communication interface configured to provide connectivity with a wireless carrier network, (b) a processing unit, (c) data storage, and (d) program instructions stored in the data storage and executable by the processing unit to carry out features described herein.

These as well as other aspects, advantages, and alternatives will become apparent to those of ordinary skill in the art by reading the following detailed description, with reference where appropriate to the accompanying drawings. Further, it should be understood that the descriptions provided in this overview and below are intended to illustrate the invention by way of example only and not by way of limitation.

DETAILED DESCRIPTION

The present disclosure will focus on a hybrid LTE/CDMA system by way of example. However, it will be understood that the principles of the disclosure can extend to apply in other scenarios as well, such as with respect to other air interface protocols. Further, even within the context of a system that supports both LTE service and CDMA service, numerous variations from the details disclosed herein may be possible. For instance, elements, arrangements, and functions may be added, removed, combined, distributed, or otherwise modified. In addition, it will be understood that functions described here as being performed by one or more entities may be implemented in various ways, such as by a processing unit executing software instructions for instance.

Figure 1:
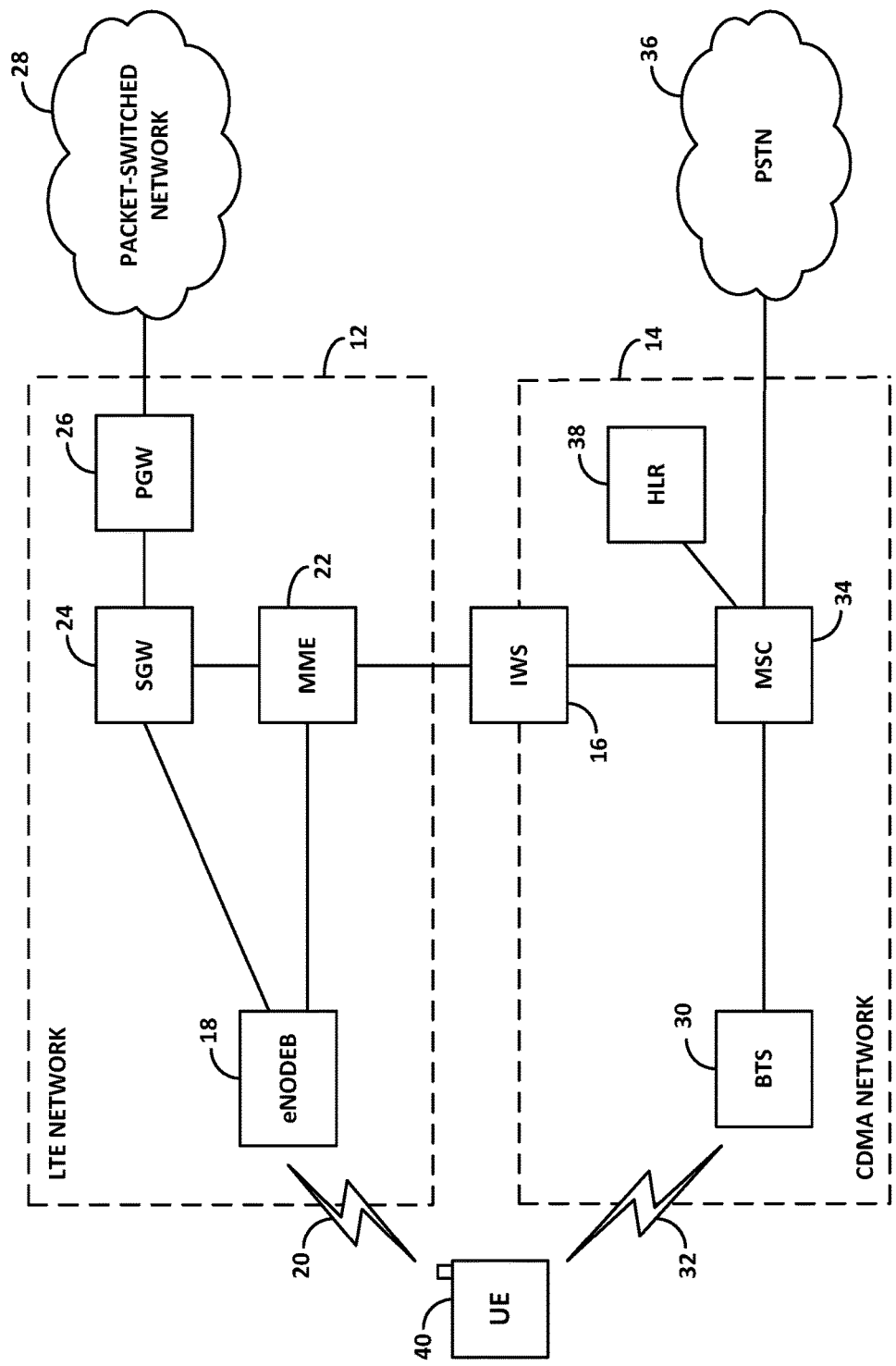
FIG. 1 is a simplified block diagram of a hybrid system in which aspects of the present disclosure can be implemented.

FIG. 1 depicts a hybrid wireless communication system including a representative LTE network 12 and a representative CDMA network 14. The LTE network 12 primarily serves UEs with wireless packet-data communication service (including perhaps voice-over-packet service and other packet-based real-time media service), and the CDMA network 14 primarily serves UEs with circuit-switched voice call service (but may also provide packet-data communication service and other types of service). Further, the hybrid system includes a representative interworking server (IWS) 16 interconnecting the networks, to facilitate exchange of signaling between the networks to facilitate CSFB operation.

As shown by way of example, the LTE network 12 includes a representative LTE base station (evolved Node B (eNodeB)) 18, which includes an antenna structure and associated equipment for engaging in LTE communication over an LTE air interface defining an LTE coverage area 20. The eNodeB 18 then has an interface with a mobility management entity (MME) 22 that can serve as a signaling and/or paging controller for the LTE network 12. Further, the eNodeB 18 and MME 22 each have a respective interface with a serving gateway (SGW) 24, which then has an interface with a packet data network gateway (PGW) 26 that provides connectivity with a packet-switched network 28.

The LTE air interface of coverage area 20 operates on a carrier that defines one or more frequency channels of defined bandwidth, such as 1.4 MHz, 5 MHz, 10 MHz, 15 MHz, or 20 MHz, with the downlink and uplink occupying separate frequency channels (in an FDD arrangement) or being multiplexed over time on a shared frequency channel (in a TDD arrangement). A representative LTE frequency channel is then divided over time into 10-millisecond frames and 1-millisecond subframes. Further, each subframe is divided over time into 67-microsecond symbol time segments, and the frequency bandwidth is divided into subcarriers that are typically spaced apart from each other by 15 kHz.

With this arrangement, every subframe essentially defines an array of resource elements, each of which is at a particular subcarrier and spans a particular symbol time segment, and these resource elements can be modulated to represent bits being communicated over the air interface. Further, various resource elements are grouped for specific use. For instance, certain resource elements cooperatively define a control channel, other resource elements cooperatively define a reference-signal channel, and other resource elements are divided into groups defining physical resource blocks (PRBs) allocable by the eNodeB for carrying data to and from a served UE.

When a UE enters into coverage of an eNodeB in this arrangement, the UE may transmit an access request to the eNodeB on an uplink random access channel and engage in further signaling with the eNodeB to establish a Radio Resource Control (RRC) connection through which the UE and the eNodeB can then engage in scheduled air interface communication. Through the RRC connection, the UE may then transmit an attach request to register with the LTE network 12, which the eNodeB would forward to the MME 22. And upon authenticating the UE, the MME 22 would then engage in signaling with the eNodeB and SGW 24 (and, in turn, the SGW engages in signaling with the PGW 26), to set up for the UE one or more bearers for carrying packet data between the UE and the packet-switched network 28. The UE may then be served by the LTE network 12 in a connected mode or an idle mode. In some examples, the network may implement tracking areas (or "paging zones"). In such an arrangement, the base station coverage areas in the network are divided into groups each defining a respective tracking area.

The CDMA network 14, on the other hand, is shown including a representative CDMA base station (base transceiver station (BTS)) 30, which includes an antenna structure and associated equipment for engaging in CDMA communication over a CDMA air interface defining a coverage area 32 co-located at least in part with the LTE coverage area 20. The BTS then has an interface, possibly through a base station controller (not shown), with a mobile switching center (MSC) 34 that serves as a signaling and/or paging controller and switch for the CDMA network and that provides connectivity with the PSTN 36. And the MSC has an interface with a home location register (HLR) 38 that stores location and profile information for UEs.

With this arrangement, normally when a UE enters into coverage of the BTS, the UE may register with the CDMA network by transmitting a CDMA registration message over the CDMA air interface to the BTS, which the BTS would forward to the MSC, and which the MSC may forward to the HLR. Upon authenticating the UE, the HLR and MSC may then establish a record that the UE is served by BTS 30, and the UE may be served by the CDMA network in an active mode or an idle mode. Thereafter, when a call comes in for the UE from the PSTN and the UE is in the idle mode, the MSC would page the UE by transmitting a CDMA page message to the BTS for transmission over the CDMA air interface, the UE would send a page response via the CDMA air interface, and the MSC would connect the call to the UE via the UE's serving BTS and the CDMA air interface.

In practice, a hybrid UE that is equipped for both LTE and CDMA service (e.g., having a radio and associated components for selectively engaging in LTE service or CDMA service) may be configured to prefer LTE service by default. Thus, when a UE is in coverage of both the LTE network 12 and the CDMA network 14, the UE may register to be served by the LTE network as discussed above.

Further, when a UE is served by the LTE network 12, the UE may be configured to operate by default in CSFB mode if the eNodeB that serves the UE supports CSFB service. An eNodeB may be configured to broadcast an indication in order to inform the UE that the eNodeB supports CSFB. For instance, with reference to FIG. 1, eNodeB 18 of the LTE network 12 may broadcast an indication to inform UEs in the eNodeB's coverage area 20 that eNodeB 18 supports CSFB service. The indication that an eNodeB supports CSFB may take various forms. As one example, the indication that an eNodeB supports CSFB may take the form of a particular flag (or set of flags) included in an overhead message broadcast by the eNodeB, such as a System Information Block 8 (SIBS) message. The indication that the eNodeB supports CSFB may take other forms as well.

To facilitate operating in CSFB mode, as discussed above, the UE may register with the CDMA network via the LTE network 12, by transmitting a CDMA registration message to the eNodeB that serves the UE, which would then pass to the MME and in turn via the IWS to the MSC. Upon authenticating the UE, the HLR and MSC may then establish a record that the UE is served by LTE network 12 via the IWS (rather than via a CDMA BTS), so that CDMA paging of the UE would then pass via the LTE network.

Thus, in the CSFB mode, when a call comes in for a UE from the PSTN, the MSC would page the UE by transmitting a CDMA page message or associated trigger via the IWS to the MME, which would cause the LTE eNodeB to transmit the CDMA page message over the LTE air interface to the UE. Upon receipt of this CDMA page message, the UE may then engage in further CDMA call setup signaling with the MSC via the LTE network, and the UE may then ultimately transition from being served by the LTE network over the LTE air interface to being served by the CDMA network over the CDMA air interface, and to engage in the call served by the CDMA network via the CDMA air interface.

Alternatively, also in line with the discussion above, when a UE is served by the LTE network, the UE may operate in a non-CSFB mode (e.g., an SRLTE mode) to allow the UE to engage in voice calls or other service served by the CDMA network. For instance, the UE may operate in non-CSFB mode when the eNodeB that serves the UE does not support CSFB. To facilitate operating in non-CSFB mode, as discussed above, while the UE is served by the LTE network, the UE may temporarily tune away from the LTE network to the CDMA network and register directly with the CDMA network, by transmitting a CDMA registration request to the BTS, so that the CDMA network would become set to page the UE via the CDMA air interface rather than via the LTE network. Upon so registering directly with the CDMA network, the UE may then tune back to the LTE network. Further, as the UE is then served by the LTE network, the UE would then periodically tune away from the LTE network to the CDMA network (e.g., at scheduled paging occasions) to check for any page messages to the UE from the CDMA network and, upon finding such a page message, would respond via the CDMA air interface.

Thus, in non-CSFB (e.g., SRLTE) mode, when a call comes in for the UE from the PSTN, the MSC would page the UE by transmitting a CDMA page message via the CDMA air interface to the UE, and after possibly further signaling with the UE via the CDMA air interface, the MSC may then connect the call through to the UE via the CDMA air interface.

In general operation, the LTE network 12 may page a UE in various scenarios. By way of example, if SGW 24 receives (from PGW 26) packet data for transmission to UE 40, the SGW may transmit to MME 22 a data-notification message, and the MME may responsively generate a paging message for the UE and transmit the paging message to each eNodeB in a registered tracking area of the UE, including eNodeB 18. Each eNodeB in the registered tracking area of the UE may thus receive from the MME the paging message destined to the UE and responsively broadcast the paging message in the manner described above. As another example, if the CDMA network 14 has a call to connect to a UE, a paging controller of the CDMA network (such as MSC 34) may generate a paging message for the UE and transmit the paging message via the IWS 16 to the LTE network 14. MME 22 may then receive that paging message and pass it along to each eNodeB in a registered tracking area of the UE, and each eNodeB may responsively broadcast the paging message to the UE in the manner described above.

However, under some circumstances, the LTE network 12 and/or one of the entities of the LTE network 12 may encounter problems with paging that may lead to a failure of the paging. For example, the LTE network 12 may encounter a failure during the process of broadcasting a paging message directed to a UE. For instance, the MME 38 may fail to generate a paging message in response to encountering a trigger (e.g., receiving a data-notification message from the SGW) to generate the paging message. In another instance, the MME 38 may fail to transmit a generated paging message to an eNodeB of the LTE network 12. In yet another instance, an eNodeB of the LTE network 12 may fail to broadcast a paging message in response to receiving the paging message from a network entity (e.g., the MME).

In other examples, the failure of the paging may occur even when the LTE network 12 broadcasts a paging message directed to a UE. For instance, an eNodeB may broadcast the paging message, but the UE may not receive the paging message. This scenario may occur, for example, if the eNodeB has incorrect configurations regarding paging occasions and therefore broadcasts the paging message during a paging occasion other than the paging occasion that the UE may be monitoring for paging messages.

It should be understood that these paging failures are provided as examples and that the paging process may fail in other manners and for various other reasons. For example, the failure of the paging may occur with respect to services other than CSFB service (e.g., a failure of paging with respect to LTE data service).

The failure of paging in the LTE network 12 may be detected by the LTE network and/or one of the entities of the LTE network. For example, after encountering a paging trigger, the MME 22 may be arranged to wait a predefined period of time for a response message from the paged UE (e.g., a page response), but may detect that it has not received a response within that period of time and may interpret such a detection as a failure of paging. In another example, the MME may be configured to attempt to page the UE again after detecting that a first paging attempt has failed. The MME may then determine that the paging of the UE has failed after the MME has attempted to page the UE a threshold extent of paging attempts.

As noted above, the failure of paging in the LTE network 12 may affect the operation of services, such as CSFB, that are provided by the LTE network. In accordance with the present disclosure, an LTE network may be configured to detect a threshold extent of failure of paging in the LTE network and responsively take remedial action.

To facilitate detecting a threshold extent of failure of paging, for instance, the LTE network 12 and/or one of the entities of the LTE network may detect a quantity of paging failures in the LTE network, such as two or more paging failures. If the LTE network 12 then determines that the detected quantity meets certain conditions, the LTE network may responsively take one of the remedial actions disclosed herein. For instance, such conditions may be based on the number of detected paging failures, and thus the LTE network 12 may respond this way if the detected quantity exceeds the predefined threshold. Additionally or alternatively, such conditions may be based on when the paging failures are detected, and thus the LTE network 12 may respond this way if each of the detected quantity of paging failures occurred recently, such as within a predefined period of time preceding the most recently-detected paging failure.

In an implementation, in response to detecting a threshold extent of failure of paging, the LTE network 12 may select one or more UEs served by the LTE network and cause each selected UE to transition from operating in CSFB mode to operating in non-CSFB mode. The LTE network may select the one or more UEs based on various criteria. As just a few representative examples, such criteria may include the location of the UEs (e.g., UEs at the cell edge), a service class and/or priority level assigned to the UEs (e.g., UEs associated with a pre-paid account), a usage measure associated with the UEs (e.g., UEs that generate a greater extent of signaling traffic associated with CSFB), and/or UE capabilities (e.g., whether or not the UE is capable of using non-CSFB when CSFB is not available).

As another example, the LTE network may select the one or more UEs from UEs that are served by an eNodeB that has encountered or has been impacted by the threshold extent of paging failure. As yet another example, the LTE network may select the one or more UEs from UEs of a respective tracking area, and cause the selected UEs to transition from operating in CSFB mode to operating in non-CSFB mode in response to at least one of the eNodeBs that define the respective tracking area encountering a threshold extent of failure of paging.

Further, the act of causing the selected UE(s) to transition from operating in CSFB mode to operating in non-CSFB mode may take various forms. For instance, the LTE network 12 may be configured to trigger one or more eNodeBs that are serving the one or more selected UEs to transmit signals that cause the UEs to transition from operating in CSFB mode to operating in non-CSFB mode. These transmitted signals may take various forms. As one possible example, the signal may take the form of an additional flag in a UE-specific message, such as an RRC Connection Reconfiguration message in LTE, which may be sent to each selected UE. Other examples are possible as well.

Figure 2:
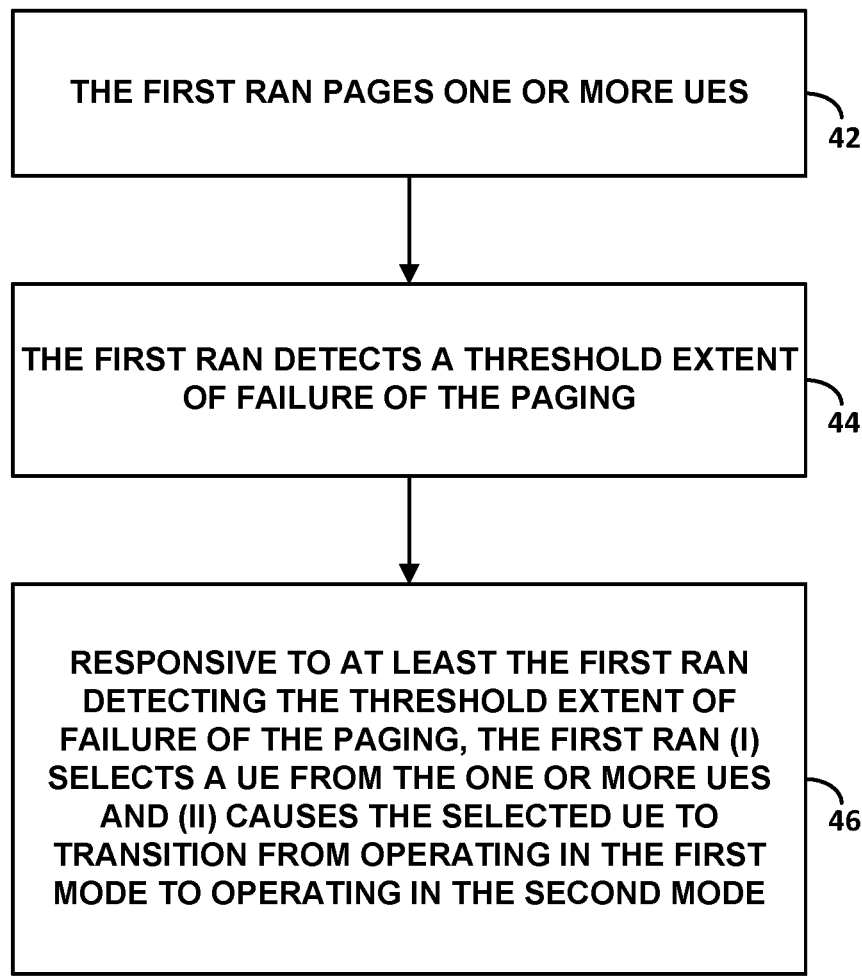
FIG. 2 is a flow chart depicting operations that can be carried out in accordance with the present disclosure.

In another implementation, in response to detecting a threshold extent of failure of paging, the LTE network 12 and/or one of the entities of the LTE network may cause one or more eNodeBs that are each configured to broadcast an indication that the eNodeB supports CSFB to cease broadcasting the indication that the eNodeB supports CSFB (e.g., by turning off the CSFB-related flags in the SIB8 message). The one or more eNodeBs that the LTE network causes to cease broadcasting the indication may be selected by the LTE network based on various criteria. For instance, the LTE network may cause an eNodeB that has encountered a threshold extent of failure of paging to cease broadcasting the indication that the eNodeB supports CSFB. In another instance, the LTE network may cause a group of eNodeBs that define a tracking area to cease broadcasting the indication that the eNodeBs support CSFB in response to at least one of the eNodeBs of the group encountering a threshold extent of failure of paging. Turning now to FIG. 2, a flow chart is shown depicting functions that can be carried out by a first RAN in accordance with the present disclosure. The first RAN (e.g., an LTE network) provides high speed data communications on a first air interface protocol and is interconnected with a second RAN (e.g., a CDMA network) that provides traditional telephony service on a second air interface protocol different from the first air interface protocol. As shown in FIG. 2, at block 44, the first RAN pages (e.g., attempts to page, or should page) one or more UEs. Further, at block 46, the first RAN detects a threshold extent of failure of the paging. Yet further, at block 48, responsive to at least the first RAN detecting the threshold extent of failure of the paging, the first RAN (i) selects a UE from the one or more UEs and (ii) causes the selected UE to transition from operating in the first mode to operating in the second mode. As explained above, in the context of a LTE/CDMA system, the first mode may be CSFB mode and the second mode may be non-CSFB mode (e.g., SRLTE mode)

Figure 3:
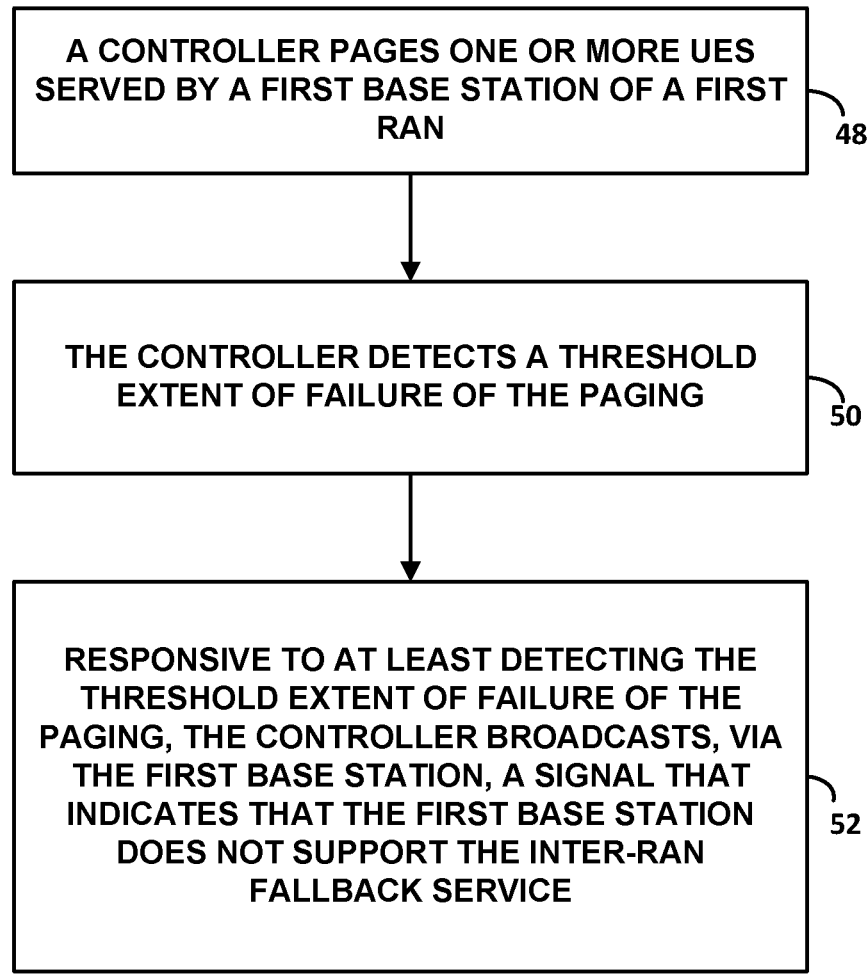
FIG. 3 is another flow chart depicting operations that can be carried out in accordance with the present disclosure.

FIG. 3 is next a depiction of functions that can be performed by a first RAN (e.g., an LTE network) that provides high speed data communications on a first air interface protocol. The first RAN is part of a wireless communication system and is interconnected with a second RAN (e.g., a CDMA network) that provides traditional telephony service on a second air interface protocol different from the first air interface protocol. As shown in FIG. 3, at block 48, a controller of the wireless communication system pages (e.g., attempts to page, or should page) one or more UEs served by a first base station of the first RAN. In line with the discussion above, the controller of the system may be, for example, the signaling and/or paging controller of the LTE network (e.g., the MME of the LTE network). In another example, the controller may be a controller of one of the eNodeBs of the LTE network.

Further, at block 50, the controller detects a threshold extent of failure of the paging. Yet further, at block 52, the controller responds to at least detecting the threshold extent of failure of the paging by broadcasting, via the first base station, a signal that indicates that the first base station does not support the inter-RAN fallback service.

Figure 4:
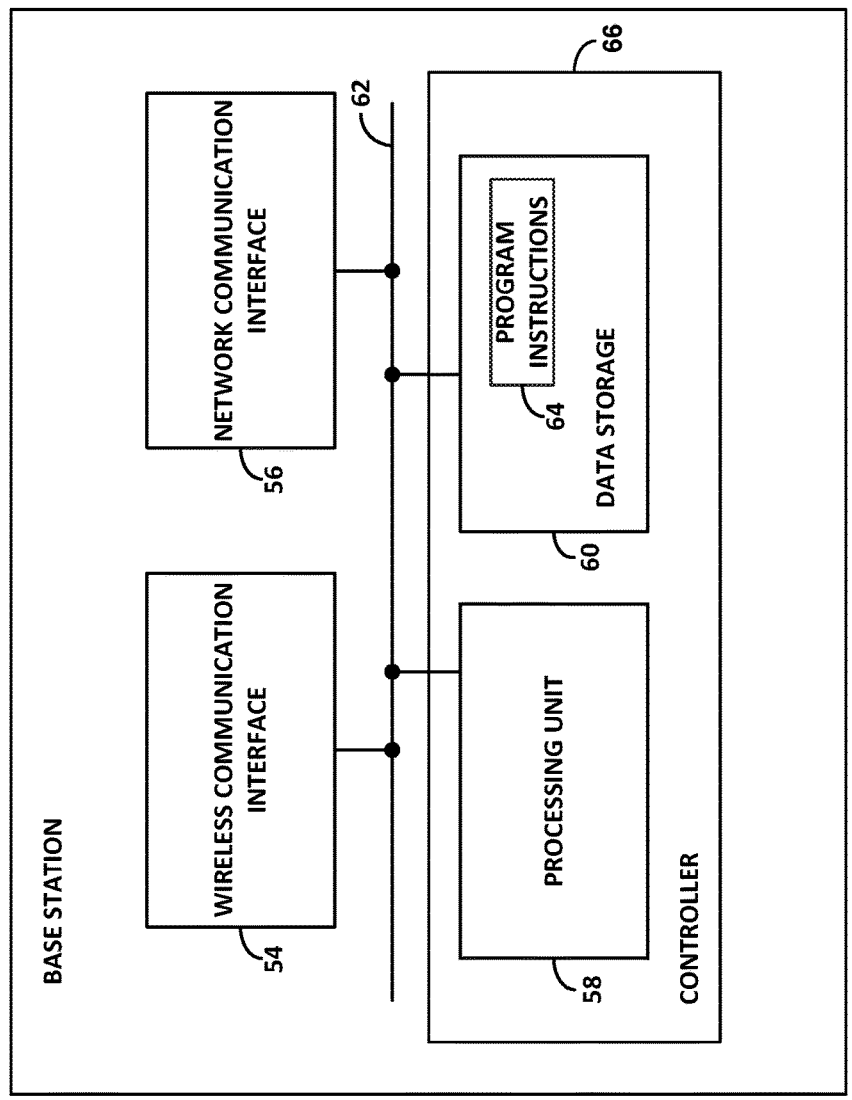
FIG. 4 is a simplified block diagram of a base station operable in a network arrangement such as that depicted in FIG. 1.

Finally, FIG. 4 is a simplified block diagram of an example base station of network 12 (e.g., an eNodeB), showing some of the functional components that may be included in such an entity to facilitate implementation of the disclosed methods. As shown in FIG. 4, the example base station includes a wireless communication interface 54, a network communication interface 56, and a controller 66, all linked together via a system bus, network, or other connection mechanism 62.

In this arrangement, wireless communication interface 54 may be configured to engage in air interface communication with served UEs. As such, wireless communication interface 54 may comprise an antenna structure, which may be tower mounted, and associated components such as a power amplifier and a wireless transceiver, so as to facilitate transmission and reception of bearer and control traffic over the air interface.

Network communication interface 56 may then be configured to provide for communication with various other network elements in a network (e.g., network 12 in FIG. 1), such as a controller (e.g., an MME) or a transport-network gateway (e.g., an SGW). As such, network communication interface 56 may include one or more network interface modules, such as Ethernet network interface modules for instance, or may take any of a variety of other forms that support wireless and/or wired communication with these and other network elements.

And as shown, controller 66 could include a processing unit 58, data storage 60, and program instructions 64. Processing unit 58 may comprise one or more general-purpose processors (e.g., microprocessors) and/or one or more special-purpose processors (e.g., application specific integrated circuits), which may be integrated in whole or in part with the communication interfaces. And data storage 60 may comprise one or more volatile and/or non-volatile storage components, such as optical, magnetic, or flash memory, which may be integrated in whole or in part with processing unit 58. Data storage 60 may hold the program instructions 64 that are executable by processing unit 58 to carry out various functions described herein.

Exemplary embodiments have been described above. Those skilled in the art will understand, however, that changes and modifications may be made to these embodiments without departing from the true scope and spirit of the invention.

We claim:

1. In a communication system comprising a first radio access network (RAN) configured to serve user equipment devices (UEs) over a first air interface, wherein the first RAN is interconnected with a second RAN configured to serve the UEs over a second air interface, wherein each UE has a first mode of operation and a second mode of operation, and wherein each UE operates by default in the first mode, a method comprising:

the first RAN paging one or more UEs;

the first RAN detecting a threshold extent of failure of the paging; and responsive to at least the first RAN detecting the threshold extent of failure of the paging, the first RAN (i) selecting a UE from the one or more UEs and (ii) causing the selected UE to transition from operating in the first mode to operating in the second mode, wherein in the first mode, while the selected UE is served by the first RAN via the first interface, the selected UE is registered with the second RAN via the first RAN and is configured to engage in call setup signaling with the second RAN via the first air interface, and wherein in the second mode, while the selected UE is served by the first RAN via the first interface, the selected UE is registered directly with the second RAN and is configured to engage in call setup signaling with the second RAN via the second air interface.

2. The method of claim 1, wherein selecting the UE is based at least in part on the UE supporting both CSFB operation and non-CSFB operation.

3. The method of claim 1, wherein the one or more UEs are served by one or more base stations of the first RAN.

4. The method of claim 3, wherein the first RAN paging the one or more UEs comprises:

a paging controller of the first RAN encountering one or more triggers to transmit one or more paging messages to the one or more base stations;

responsive to the paging controller encountering the one or more triggers, the paging controller generating the one or more paging messages to transmit to the one or more base stations.

5. The method of claim 4, wherein the first RAN detecting a threshold extent of failure of the paging comprises the first RAN detecting the paging controller failing to transmit a threshold extent of the one or more paging messages to the one or more base stations.

6. The method of claim 3, wherein the first RAN detecting a threshold extent of failure of the paging comprises the first RAN detecting the one or more base stations failing to broadcast a threshold extent of one or more paging messages to the one or more UEs.

7. The method of claim 3, wherein the first RAN paging the one or more UEs comprises the one or more base stations broadcasting one or more paging messages to the one or more UEs, and wherein the first RAN detecting a threshold extent of failure of the paging comprises the first RAN detecting from the one or more UEs a threshold extent of an absence of a response to the one or more paging messages.

8. The method of claim 1,
wherein in the first mode, the selected UE does not tune-away from the first RAN to the second RAN to check for pages via the second air interface, and
wherein in the second mode, the selected UE periodically tunes-away from the first RAN to the second RAN to check for pages via the second air interface.

9. In a communication system comprising a first radio access network (RAN) configured to serve user equipment devices (UEs) over a first air interface, wherein the first RAN is interconnected with a second RAN configured to serve the UEs over a second air interface, wherein each UE supports circuit switched fallback (CSFB) mode and non-CSFB mode, and wherein each UE operates by default in CSFB mode, a method comprising:
the first RAN paging one or more UEs;
the first RAN detecting a failure of the paging; and
responsive to at least the first RAN detecting the failure of the paging, the first RAN causing at least one UE of the one or more UEs to transition from operating in CSFB mode to operating in non-CSFB mode,
wherein in CSFB mode, while the at least one UE is served by the first RAN via the first interface, the at least one UE is registered with the second RAN via the first RAN and is configured to engage in call setup signaling with the second RAN via the first air interface, and
wherein in non-CSFB mode, while at least one UE is served by the first RAN via the first interface, the at least one UE is registered directly with the second RAN and is configured to engage in call setup signaling with the second RAN via the second air interface.

10. The method of claim 9, wherein the first RAN paging the one or more UEs comprises the first RAN attempting to page a UE more than once.

11. The method of claim 10, wherein each paging attempt comprises the first RAN broadcasting one or more paging messages to the UE.

12. The method of claim 11, wherein the first RAN detecting a failure of the paging comprises the first RAN detecting an absence of a response from the UE after a threshold extent of paging attempts.

13. The method of claim 9,
wherein in CSFB mode, the at least one UE does not tune-away from the first RAN to the second RAN to check for pages via the second air interface, and
wherein in non-CSFB mode, the UE periodically tunes-away from the first RAN to the second RAN to check for pages via the second air interface.

14. A wireless communication system comprising:
one or more base stations of a first radio access network (RAN) serving user equipment devices (UEs) over a first air interface;
an interconnection between the first RAN and a fallback RAN, wherein the fallback RAN serves the UEs over a second air interface different from the first air interface, and wherein the first RAN is configured to provide an inter-RAN fallback service to the UEs in which, while the UEs are served by the first RAN, the first RAN passes pre-registration signaling and call-setup signaling between the fallback RAN and the UEs to facilitate transition of the UEs from being served over the first air interface by the first RAN to being served with calls over the second air interface by the fallback RAN; and
a controller comprising at least one processing unit, data storage, and program instructions stored in the data storage and executable by the at least one processing unit to carry out operations, the operations comprising:
paging one or more UEs served by a first base station of the one or more base stations;
detecting a threshold extent of failure of the paging; and
responsive to at least detecting the threshold extent of failure of the paging, broadcasting, via the first base station, a signal that indicates that the first base station does not support the inter-RAN fallback service.

15. The wireless communication system of claim 14, wherein the inter-RAN fallback service is circuit switched fallback (CSFB).

16. The wireless communication system of claim 14, wherein broadcasting, via the first base station, a signal that indicates that the first base station does not support the inter-RAN fallback service comprises broadcasting a System Information Block #8 (SIBS) message omitting a flag that indicates the first base station's support of the inter-RAN fallback service.

17. The wireless communication system of claim 14, wherein broadcasting, via the first base station, a signal that indicates that the first base station does not support the inter-RAN fallback service comprises transmitting to at least one UE from the one or more UEs an RRC Connection Reconfiguration message that directs the at least one UE to refrain from using the inter-RAN fallback service.

18. The wireless communication system of claim 14, wherein the one or more base stations includes the first base station and further includes one or more base stations that comprise a tracking area, and wherein the operations further comprise:
responsive to at least detecting the threshold extent of failure of the paging, broadcasting, via the one or more base stations of the tracking area, a signal that indicates that the one or more base stations of the tracking area do not support the inter-RAN fallback service.

19. The wireless communication system of claim 16, wherein paging one or more UEs served by a first base station comprises broadcasting, via the first base station, one or more paging messages to the one or more UEs.

20. The wireless communication system of claim 19, wherein detecting the threshold extent of failure of the paging with respect to the first base station comprises detecting from the one or more UEs served by the first base station a threshold extent of an absence of a response to the one or more paging messages.

* * * * *